Patented Feb. 26, 1946

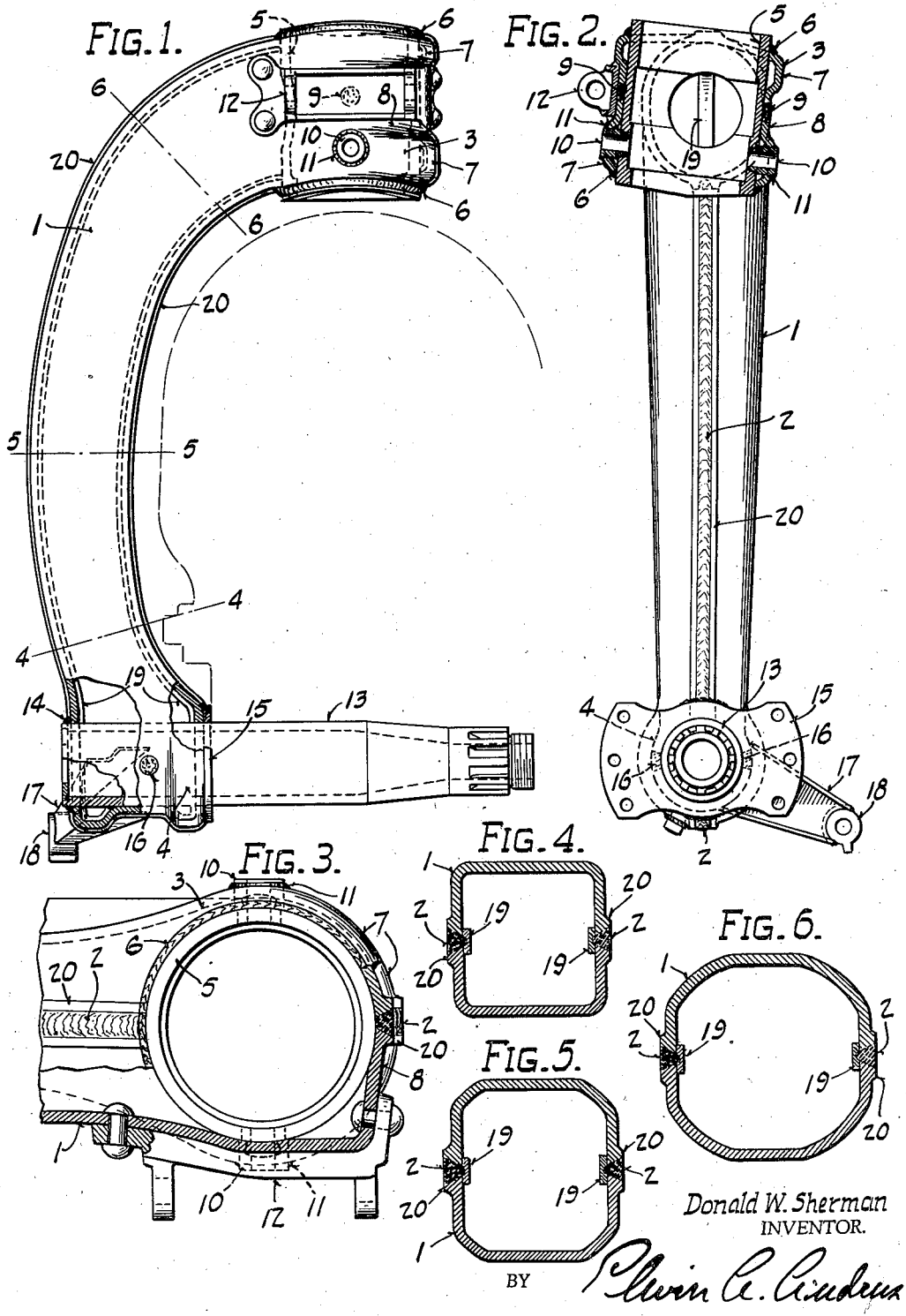

2,395,690

UNITED STATES PATENT OFFICE 2,395,690

WELDED PRESSED METAL LANDING GEAR STRUT

Donald W. Sherman, Shorewood, Wis., assignor to A. O. Smith Corporation, Milwaukee, Wis., a corporation of New York Application November 10, 1941, Serial No. 418,575

11 Claims. (Cl. 244—100)

This invention relates to a welded pressed steel landing gear strut for airplanes.

Heretofore, landing gear wheel support members have been constructed by forging operations and then machined to obtain the required sections. This involves a great deal of machining resulting in a large amount of scrap material.

Because of the cost of the forged struts attempts have been made to produce struts by fabrication from sheet metal plates with modern methods of welding. None of these attempts, heretofore, have been successful, the strength and fatigue life having been found to be inadequate.

The principal object of the present invention is to provide a strut of relatively light weight parts shaped to most effectively strengthen the regions requiring strength and in which the reenforcement of the parts is readily accomplished without a large amount of expensive machining and without a large amount of scrap losses.

A more specific object is to eliminate the weaknesses existing in prior welded designs and to fabricate a strut from sheet metal parts pressed to shapes most advantageous for withstanding service requirements and welded together in a more efficient manner and at locations least subject to rupture, and which is stronger for its weight than previous struts.

Another object is to provide a welded strut which can be readily fabricated in volume production and to close tolerances in dimension.

Other, more detailed objects and advantages will appear in the description of a preferred embodiment of the invention illustrated in the accompanying drawing.

In the drawing:

Figure 1 is a rear elevation of the strut with parts of the lower hub broken away and sectioned;

Fig. 2 is a side elevation of the strut taken from the right in Figure 1 and showing the upper hub in central vertical section;

Fig. 3 is an enlarged top plan view of the upper hub partly in section;

Fig. 4 is an enlarged transverse section through the body taken on line 4—4 of Figure 1;

Fig. 5 is an enlarged transverse section through the body taken on line 5—5 of Figure 1; and Fig. 6 is an enlarged transverse section through the body taken on line 6—6 of Figure 1.

The strut has a curved tubular body 1 formed of two complementary semi-tubular halves with their marginal edges welded together along longitudinal lines 2 on the opposite sides of the structure. The curvature of the body is substantially that of a right angle in direction to provide an upper hub portion 3 having a substantially vertical axis and a lower hub portion 4 having a substantially horizontal axis. The weld lines 2 are on the outside and inside of the curvature, respectively.

The upper hub portion 3 of body 1 has a substantially vertical opening therethrough for receiving a cylindrical hub lining sleeve 5 which is arc welded in place by the circumferential fillet welds 6 at each end, between it and the respective part of the body encircling the hub. The hub portion 3 is shaped outwardly to form two bands 7 around the sleeve 5, and contacts with the lining at the upper and lower edges of portion 3 where the welds 6 are and also over a central band 8 which is key welded through openings to sleeve 5 as at 9. The key welds 9 provide a substantial shear strength and relieve the end welds 6 of certain stresses from vertical loads in service.

Aligned plugs 10 may be provided on opposite sides of the upper hub at the lower band 7 of portion 3 and are constructed by driving a shouldered or flanged tubular member into openings drilled through the hub parts, and then welding the outer rim of the shoulder or flange to the end portion 3 of the body as at 11. These plugs serve for shear pins which tie the strut to the shock absorber cylinder and the shoulder on the plugs should fit tightly against the hub to provide good pull-up resistance for the attachment.

A forged bracket 12 may also be provided on the rear side of the hub portion 3 for attaching links which prevent rotation of the strut relative to the plane. The bracket 12 fits against band 8 in between the two bands 7 of the upper hub and is riveted at its ends to body 1.

The lower hub portion 4 encircles one end of the tubular axle 13 in a manner similar to the encircling of sleeve 5 by the upper hub portion 3. However, the axle 13 is welded to portion 4 along the circumferential line 14 where the outer band of portion 4 engages the axle. The axle engages the opening through the inner band of portion 4 by a drive fit that leaves no clearance at any region in the circumference and effects a transmittal of working stresses between the axle and hub.

The brake anchoring plate 15 is arc welded directly to the inner side of portion 4 and has a central opening in which the axle 13 fits by a drive fit. The plate 15 serves to reenforce the portion 4 of the arm at this point and to increase the bearing surface for holding the axle. The axle should not be welded to the inner side of end portion 4 or to the plate 15 since welding at this point might result in some undercutting of the axle at the location of maximum bending stress and invariably results in failure.

Two plug welds 16 secure the central band of hub portion 4 to the axle similar to the key welds 9 on the upper hub portion 3. The welds 16 take the lateral shear stress and eliminate bending action at the end connection adjacent weld 14, and thereby prevent failure from fatigue.

The retract support bracket 17 is constructed of sheet metal of channel shape and at one end is welded to the outer surface of the hub portion 4. A bearing 18 for pivotal connection to a link is welded to the outer end of the bracket 17.

The body 1 preferably has a varying cross-sectional shape as illustrated in Figures 4, 5, and 6. Fig. 4 is taken near the lower end of the body above hub portion 4, and shows a substantially square cross section for the body 1 at this point. Fig. 5 is taken about in the middle of the body and shows the body as having curved corner portions and straight side walls at this location. Fig. 6 is taken near the upper end of body 1 where the latter has a substantially circular cross section. It is one of the features of the present invention that the shape of the body can be varied as the design for stress requires. The shape of the body 1, as illustrated, is designed to provide for substantially uniform and equal stress conditions throughout, and is employed because of the inability to vary the thickness of the metal from end to end.

The seams 2 which are shown in cross section in Figs. 4, 5 and 6 are preferably welded by electric arc welding employing a V butt joint with a chill strip 19 on the inside of the joint.

After fabrication of the strut the metal is preferably heat treated to raise its ultimate tensile strength to approximately 180,000 pounds per square inch. This heat treatment has been found to result in a lower increase of the ultimate tensile strength for the weld. Consequently, in order to provide a weld of a tensile strength comparable to that of the body parts the edges of the parts are suitably thickened as at 20 prior to welding, as illustrated in Figs. 4, 5 and 6. This thickening is preferably provided by upsetting after pressing the halves to shape or after an intermediate pressing operation. The upset 20 is provided on the outside of the part as distinguished from the inside and is preferably shaped on a bevel as shown to provide for the V shaped welding groove between the edges. After welding the edges for their full thickness the outermost surfaces of the welds and of the upset 20 are ground off smooth to eliminate any roughness which might tend to result in fatigue of the joint.

The strut, after heat treatment, is subjected to suitable machining operations. A reasonable amount of machining stock is provided by extra thickness of both the upper hub sleeve 5 and the lower hub portion 4 and of the brake plate 15. In machining, the center of the upper end of sleeve 5 in the unmachined state is first determined. Swiveling about this point, the strut is set up so that the center line of the boring bar is the proper distance away from the brake plate 15 and the sleeve 5 is finish bored on this center line. Then the face of the plate 15 is finished off and the center line for the axle 13 is determined, and hub portion 4 finish bored on this center line, at right angles to the center line of the bore sleeve 5.

Various embodiments of the invention may be employed within the scope of the accompanying claims.

The invention is claimed as follows:

1. A pressed steel landing gear strut for airplanes, comprising a tubular body member extending laterally from an upper hub having a substantially vertical axis and curved downwardly to a lower hub carrying a substantially horizontal axle for a supporting wheel, said curved body member being formed from two longitudinally extending complementary channel-shaped halves with their longitudinal edges disposed in abutting relation on the outside and inside of the curve, respectively, and welded together.

2. In a pressed steel landing gear strut, a hollow hub section having a bore to receive an axle, and a tubular light weight axle extending through said hub and engaging the inner side thereof by a drive fit free of welding, the outer side of the hub being welded to the axle adjacent the end of the latter.

3. A pressed steel landing gear strut for airplanes, comprising a curved tubular body member formed from two longitudinally extending complementary halves with their corresponding longitudinal edges welded together, said body having different cross-sectional shape from end to end, varying from a substantially square cross section near its lower end portion to a substantially circular cross section near its upper end portion.

4. A pressed steel landing gear strut for airplanes, comprising a cylindrical member and a curved tubular body member having an end formed to encircle the cylindrical member passing therethrough, said end having raised circumferential band portions with edge portions and an intermediate central band portion engaging said cylindrical member.

5. A pressed steel landing gear strut for airplanes, comprising a curved tubular body member having an end formed to encircle a cylindrical member passing therethrough, said end having raised circumferential band portions with edge portions and an intermediate central band portion engaging said cylindrical member, a circumferential weld securing said cylindrical member to the edge portion of at least one of said first named bands, and a weld securing said central band portion to said cylindrical member.

6. A pressed steel landing gear strut for airplanes, comprising a curved tubular body member constituted of two longitudinally extending channel-shaped complementary halves with their corresponding longitudinal edges butt-welded together along the inside and outside of the curvature thereof and in the plane of the curvature, and a circular hub portion at one end of said member having its axis in the plane of the welds with said complemental halves curved together around the same to provide a substantially cylindrical opening therethrough.

7. A pressed steel landing gear strut for airplanes, comprising a curved tubular body member constituted of two longitudinally extending channel-shaped complementary halves with their corresponding longitudinal edges butt-welded together along the inside and outside of the curvature thereof and in the plane of the curvature, and a circular upper hub portion having a substantially vertical axis in the plane of said welds and formed by the curving of the ends of the two halves toward each other and welding the same longitudinally of the hub to provide a substantially cylindrical opening through the hub for receiving an oleo or the like.

8. A pressed steel landing gear strut for airplanes, comprising a curved tubular body member constituted of two longitudinally extending channel-shaped complementary halves with their corresponding longitudinal edges butt-welded together along the inside and outside of the curvature thereof and in the plane of the curvature, and a circular lower hub portion having a substantially horizontal axis in the plane of said welds and formed by the curving of the ends of the two halves toward each other and welding the same longitudinally of the hub to provide a substantially cylindrical opening through the hub for receiving a wheel axle or the like.

9. A pressed steel landing gear strut for airplanes, comprising a curved tubular body member constituted of two longitudinally extending channel-shaped complementary halves with their corresponding longitudinal edges butt-welded together along the inside and outside of the curvature thereof and in the plane of the curvature, a circular upper hub portion having a substantially vertical axis in the plane of said welds and formed by the curving of the ends of the two halves toward each other and welding the same longitudinally of the hub to provide a substantially cylindrical opening through the hub for receiving an oleo or the like, and a circular lower hub portion having a substantially horizontal axis in the plane of said welds and formed by the curving of the ends of the two halves toward each other and welding the same longitudinally of the hub to provide a substantially cylindrical opening through the hub for receiving a wheel axle or the like.

10. In a pressed steel landing gear strut for airplanes, a tubular body member constituted of two longitudinally extending complementary channel-shaped halves with their corresponding longitudinal edges butt-welded together on opposite sides thereof, and a circular hub portion at one end of said member having its axis in the plane of said welds and formed by the closing of the ends of said halves together around a substantially cylindrical opening therethrough, said hub portion having a weld joining the closed ends of the halves along a line longitudinally of the hub and having radially outward ribs formed in the hub circumferentially thereof near the ends of the hub.

11. A welded pressed metal landing gear strut for airplanes, comprising a tubular body member having an upper hub end portion adapted to receive an oleo or the like and a lower hub end portion adapted to receive a wheel axle or the like, said member being free of transverse welds from end to end and having two longitudinal butt-welds disposed in outwardly thickened stock on opposite sides of the member and with weld surfaces smooth and flush with the stock and free from crevices tending to cause injurious stress concentrations, and said end hub portions being substantially at right angles to each other with the intermediate body curved through approximately 90° to approach each hub portion at right angles thereto.

DONALD W. SHERMAN.